(12) United States Patent
Kasser

(10) Patent No.: US 7,653,946 B2
(45) Date of Patent: Jan. 26, 2010

(54) METHOD AND SYSTEM FOR SECURE DISTRIBUTION OF DIGITAL DOCUMENTS

(75) Inventor: Bernard Kasser, Ceyreste (FR)

(73) Assignee: STMicroelectronics SA, Montrouge (FR)

( * ) Notice: Subject to any disclaimer, the term of this patent is extended or adjusted under 35 U.S.C. 154(b) by 1049 days.

(21) Appl. No.: 10/799,371

(22) Filed: Mar. 12, 2004

(65) Prior Publication Data

US 2004/0210821 A1   Oct. 21, 2004

Related U.S. Application Data

(63) Continuation of application No. PCT/FR02/03118, filed on Sep. 12, 2002.

(30) Foreign Application Priority Data

Sep. 14, 2001   (FR) .................................. 01 11890

(51) Int. Cl.
*G06F 7/04* (2006.01)

(52) U.S. Cl. .................. 726/28; 713/155; 713/193; 713/171; 713/169; 713/158; 726/27; 726/4

(58) Field of Classification Search ................. 715/500; 726/28
See application file for complete search history.

(56) References Cited

U.S. PATENT DOCUMENTS

| | | | |
|---|---|---|---|
| 5,261,002 A * | 11/1993 | Perlman et al. ................ 380/30 |
| 5,530,235 A * | 6/1996 | Stefik et al. .................. 235/492 |
| 5,687,235 A * | 11/1997 | Perlman et al. ............. 713/158 |
| 5,949,877 A * | 9/1999 | Traw et al. .................. 713/171 |
| 6,581,160 B1 * | 6/2003 | Harada et al. ................ 713/169 |
| 6,850,914 B1 * | 2/2005 | Harada et al. .................. 705/57 |
| 7,076,432 B1 * | 7/2006 | Cheah et al. ................. 704/500 |
| 7,260,715 B1 * | 8/2007 | Pasieka ....................... 713/158 |
| 2002/0104019 A1 * | 8/2002 | Chatani et al. .............. 713/201 |
| 2002/0112172 A1 * | 8/2002 | Simmons ..................... 713/193 |
| 2003/0074563 A1 * | 4/2003 | Spacey ........................ 713/181 |
| 2003/0126430 A1 * | 7/2003 | Shimada et al. ............. 713/155 |
| 2003/0126457 A1 * | 7/2003 | Kohiyama et al. .......... 713/193 |
| 2004/0083487 A1 * | 4/2004 | Collens et al. ................ 725/31 |
| 2004/0125957 A1 * | 7/2004 | Rauber et al. ............... 380/259 |

FOREIGN PATENT DOCUMENTS

| | | |
|---|---|---|
| EP | 1098311 | 5/2001 |
| WO | 00/67258 | 11/2000 |
| WO | 01/42886 | 6/2001 |

* cited by examiner

*Primary Examiner*—Kambiz Zand
*Assistant Examiner*—Yonas Bayou
(74) *Attorney, Agent, or Firm*—LIsa K. Jorgenson; Allen, Dyer, Doppelt, Milbrath & Gilchrist, P.A.

(57) ABSTRACT

The secure circulation of digital documents to be reproduced includes providing each user with a smart card containing identification information associated therewith, and identifying from a server connected to a digital data transmission network the smart card connected thereto. Information identifying a document to be played back is transmitted to the server from a terminal connected to the smart card. In response, a decryption key specific to the document to be reproduced is transmitted to the smart card for storing therein. The document to be played back is decrypted using an adapted reader connected to the smart card, and includes the stored decryption key for document playback with the reader. Information identifying the readers is inserted into the smart card, and fraudulent use of the smart card is determined according to the reader identification information stored in the smart card.

29 Claims, 1 Drawing Sheet

METHOD AND SYSTEM FOR SECURE DISTRIBUTION OF DIGITAL DOCUMENTS

RELATED APPLICATIONS

The present application is a continuation of International Application No. PCT/FR02/03118 filed on Sep. 12, 2002, the entire disclosure of which is incorporated herein by reference.

FIELD OF THE INVENTION

The present invention relates to the secure distribution of digital documents. In particular, although not exclusively, it applies to the distribution of musical works in digitized form, whether on a recorded media such as CDROMs or through a public data transmission network such as the Internet. The present invention is directed to fighting against the illegal circulation over the Internet of protected works, such as musical, literary or movie works, and also software.

BACKGROUND OF THE INVENTION

Since the introduction of the Internet and digital audio data coding and compression standards, such as the MPEG or MP3 standards, the circulation of illegal copies of musical works has substantially increased. Recently, file exchange services have been set up which are accessible through the Internet. These services allow software to be downloaded so that any user of the Internet possessing a computer can access file lists to download them, and in exchange, to offer free access to certain files stored on the user's computer hard disk. The references and access path are inserted for this purpose in one of these lists. These services seem to have enjoyed great success among Internet users, who may thus set up, at a reduced price, a personal library of musical or video works, and also software. These illegal copies of works have therefore increased to such a point that they amount to several million dollars per year or more.

For controlling the distribution of digital documents, it has already been proposed to use techniques by which a customer may examine a catalog of documents accessible through a public digital data transmission network, and select documents to purchase. Software installed on the client terminal sends in encrypted form, identification information of the customer's credit card to a distributor organization which, in turn, transmits the selected documents to the customer, also in encrypted form. The software installed on the customer's terminal then uses a secret key to decrypt the received documents so that they can be used.

However, even if the document is protected through encryption during its transmission to the customer, subsequent unauthorized distribution of the latter cannot be prevented once it has been decrypted by the customer. To address this problem, there has also been proposed a technique according to which a password is sold to the customer for decrypting a document loaded onto a document playback apparatus. This password can only be used on the customer's machine or only by the customer as a complement of specific biometric information relating to the customer. Even if the encrypted document may be distributed to other persons, the customer's password and the biometric information do not allow the document to be decrypted.

A distribution system that distributes documents in encrypted form, wherein the users may purchase copy licenses for those documents which are stored in a personal chip card made available to each user, has also been contemplated. This approach is described, for example, in U.S. Pat. Nos. 5,754,548 and 6,035,239.

Since the documents are encrypted, they may freely circulate, in particular, over the Internet. For copying such a document, such as copying the musical work it contains, for example, the user must possess an appropriate reader capable of reading the encrypted contents of the document, and reading information pertaining to the license which is stored in the chip card. This information is used for decrypting the document contents. Such a reader is described in WO 98/42098 and U.S. Pat. No. 5,754,648, for example.

For this purpose, a number of encryption techniques are used for authenticating the reader and the chip card and for decrypting the document. To make a "pirate" reader, it is therefore required that such a reader may authenticate itself as an authorized reader. For this purpose, a private key is needed which corresponds to a certified public reader key. Each reader possibly has a unique private key. The main loophole in this system appears when someone manages to obtain the private key of an authorized reader to make a pirate reader. In this case, it is possible by purchasing licenses to decrypt protected documents and circulate the decrypted documents. It is also possible to create software that may be circulated over the Internet enabling anyone having a computer and a chip card reader to extract the licenses stored on a chip card, decrypt the corresponding encrypted documents that are freely circulated, and freely circulate the decrypted documents.

On the other hand, a number of techniques are available for inserting information into chips to make them less likely to be accessible. However, these techniques are not entirely secure and may not take into account future technologies that pirates might be using. In addition, these techniques are not easily applicable to readers. Readers are systems substantially more sophisticated than chip cards since they comprise a processor having more inputs and outputs, and which are not dedicated to security, contrary to the chips in chip cards.

As opposed to chip card applications, such as in the fields of banking and mobile telephony, the above described secure document circulation technique uses chip cards in readers that are entirely disconnected from a possible centralized system. Fraud thus cannot be as easily detected as in applications using a centralized system that may deactivate a chip card previously detected to be fraudulent. Even if recovering the private key of such a document reader amounts to several months of work, this operation may be carried out in an exclusively private way. Once the private key of a reader has been obtained, the security offered by the system can no longer be ensured.

SUMMARY OF THE INVENTION

An object of the present invention is to overcome the above-mentioned problem. This object is achieved by providing a method for securely circulating digital documents for playback using an adapted reader, with these documents being accessible in an encrypted form.

The method comprises providing each user wishing to play back a digital document with means for securely storing identification information and containing information identifying the storage means. The method may also include identifying, from a server connected to a digital data transmission network, the means for storing the identification information that is connected to the network.

The method further includes transmitting to the server information identifying a document to be played back from a terminal connected to the storage means, and in response, transmitting from the server to the terminal a decryption key specific of the document to be played back which is stored in the storage means. The document to be played back is decrypted using an adapted reader connected to the storage means, using the stored decryption key for reproducing the decrypted document by the reader.

The method is characterized by further comprising inserting into the storage means information for identifying document readers, and determining a fraudulent use of the storage means according to the document reader identification information stored in the storage means.

Advantageously, the method according to the present invention further comprises determining, through processor means associated with the storage means, whether or not the reader used for document playback is authorized. The transmission of the decryption key from the storage means to the reader is carried out only if the reader is authorized.

Preferably, if a fraudulent use of the storage means is determined, transmitting the decryption key specific to the document to be played back from the server to the storage is not authorized, and the storage means is considered to have been used with an unauthorized reader and is deactivated by the server. This is done to prohibit any further use of the storage means for restoring a document playback by a reader.

According to a first preferred modification of this invention, the document reader identification information, stored in the storage means, comprises a list of document reader identification information identifying unauthorized readers. This list is transmitted from the server to the storage means upon connection of the storage means to the server. A fraudulent use of the storage means is determined if the reader identification information is found in the unauthorized reader list.

According to a second preferred modification of this invention, the document reader identification information stored in the storage means comprises a document reader identification information list identifying the last document readers used with the storage means. The list is transmitted from the storage means to the server upon connection of the storage means to the server along with the storage means identification information. The server compares the reader identification information contained in the received list with reader identification information contained in an unauthorized reader list for determining a fraudulent use of the storage means.

Advantageously, the server builds from the received lists of used reader identification information associated with storage means identification information, a table that contains for each identified reader a number of different storage means used in combination with the reader. The server determines that a reader is unauthorized if this number for the reader exceeds a predefined threshold, and inserts the identification information of a reader determined to be unauthorized in an unauthorized reader list.

According to a feature of the present invention, if a fraudulent use of the storage means has been determined, the requested document decryption key is not transmitted from the server to the storage means. According to another feature of the present invention, if a fraudulent use of the storage means has been determined, the server deactivates the storage means to prohibit any further use of the storage means for document playback by a reader.

The present invention also relates to a system for securely circulating digital documents so that they can be played back with an adapted reader, these documents are accessible in encrypted form. The system comprises storage means provided to each user of the system, including a secure memory area wherein information identifying the storage means are stored. A server is connected to a digital data transmission network.

At least one terminal is connected to the network and is provided with means for connecting the storage means, and comprises transmission means for transmitting to the server information identifying the storage means to which it is connected along with information identifying a document to be played back. The terminal also comprises means for receiving from the server a specific decryption key allowing the document to be decrypted, and for inserting the key into the storage means to which it is connected.

A document reader comprises means for connection to one of the storage means, means for receiving from the storage means a key for decrypting the document to be played back, and means for storing the document to be played back in encrypted form. The document reader also comprises means for decrypting a document by the decryption key received from the storage means, and means for playing back the decrypted document.

The system is characterized in that each storage means further comprises a memory area wherein information for identifying a reader list is stored, and in that the system comprises means for determining a fraudulent use of the storage means according to the contents of the list.

According to the first preferred modification of the present invention, the list stored in each storage means comprises information for identifying unauthorized readers. The server comprises transmission means for transmitting the list to the storage means by the terminal.

According to the second preferred modification of the present invention, the list stored in each storage means comprises information for identifying the last readers used with the storage means. The terminal comprises means for transmitting the list from the storage means to the server. Preferably, each storage means is a chip card.

BRIEF DESCRIPTION OF THE DRAWINGS

These objects, features and advantages of the present invention will become more apparent from the following detailed description of a non-restrictive example of an embodiment thereof, illustrated in the accompanying drawings in which.

DETAILED DESCRIPTION OF THE PREFERRED EMBODIMENTS

Figure 1:
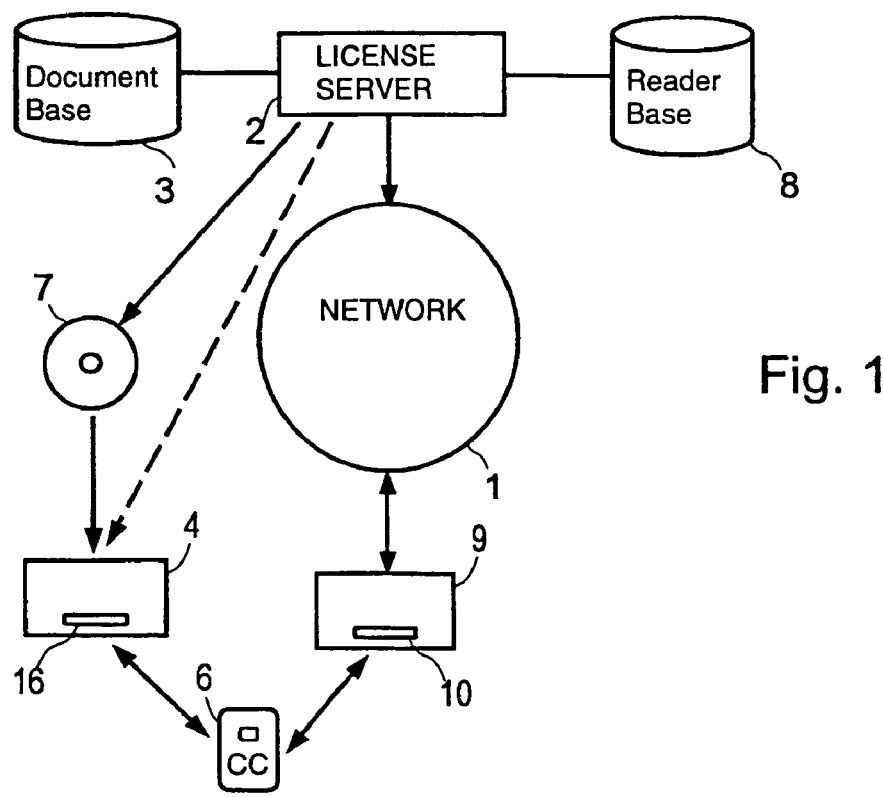
FIG. 1 schematically shows a secure distribution system according to the present invention.

In FIG. 1, the system according to the present invention comprises a digital document license server 2, for example, that is capable of accessing a library 3 of digital documents to be distributed. These digital documents may contain musical, audiovisual or literary works.

The license server 2 is connected to one or more public digital information transmission networks 1 such as the Internet, cable networks or mobile or land telephone networks, or also terrestrial or satellite radio broadcasting systems. The documents to be distributed may also be recorded on media 7 such as CDROMs or DVDs or, also memory cards having a relatively large capacity such as flash memories.

Users wishing to access such documents should have a personal chip card 6, also known as a smart or microprocessor card. The card 6 includes one or more memories, of which at least one portion is made secure, that is, inaccessible for storing confidential information. Users should also have a reader 4 adapted to play back such documents. The reader 4 and is equipped with a chip card reader 16, of course, it may be envisioned to combine, within the same device, the chip card and the memory card for storing one or more encrypted documents.

Figure 2:
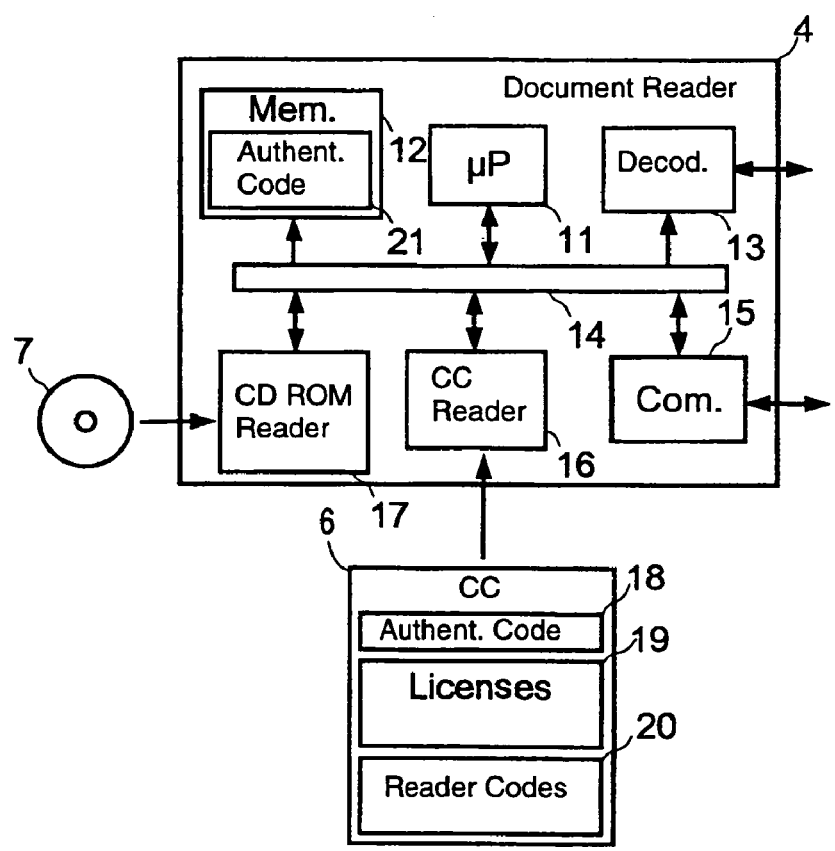
FIG. 2 schematically shows a reader used in the system shown in FIG. 1.

The documents recorded in the document library 3 or on the media 7 are encrypted by a symmetrical encryption algorithm using a secret key. These documents are freely circulated, whether from the license server 2 or through other organizations. To play back such documents, a reader 4 such as the one shown in FIG. 2 comprises a processor 11, such as a microprocessor or microcontroller, for example, which is connected via a bus 14 to data and program memories 12, as well as to decoding means 13. The decoding means 13 may be a digital/analog converter for sending the document contents once it has been decrypted to appropriate playback means. Playback means includes a video screen and/or loud-speakers, for example, if the document is an audiovisual or sound document.

When receiving documents to be played back, the reader 4 advantageously comprises communication means 15, such as a modem, for example, that is designed for connection to the network 1. The reader 4 may also or alternatively include means 17 for reading recording media 7, such as CDROMs and/or DVDs. If the recording medium is a memory card, reader 4 additionally or alternatively comprises connection means for connecting the memory card to the bus 14, which may be plugged into the housing of the reader 4, for example.

The memories 12 of the reader 4 store a pair of private and public keys and possibly a reader identification code, and include a memory area 21 which is made secure. That is, the memory area 21 is protected to make it very difficult to access. The memory area 21 stores, in particular, the private decoding key used for the secret decryption key of the documents to be played back, which has previously been encrypted through an asymmetric process.

The reader 4 also comprises a card reader 16 for the chip card 6 which stores a public key and, in a secure manner, the corresponding private key 18, and possibly, an identification code which may be identical to the card's public key. The chip card 6 also stores a list 19 of secret keys for decrypting documents that have previously been encrypted by the chip card public key. Each of the secret keys is associated with a document identifier for which the card user has purchased reproduction or playback licenses.

In order to fill this secret key list 19, the user must access a license server 2 by a terminal 9 (such as a computer) connected to the Internet 1 and a chip card reader 10, into which the card 6 is inserted, and document playback licenses are purchased. During this purchase, the chip card 6, via terminal 9, transmits its public key and, in response, the license server 2 transmits the secret keys for decrypting the corresponding documents previously encrypted by the public key transmitted from the card. The secret encrypted keys are loaded by the computer 9 and the chip card reader 4 into the chip card 6 inserted into the latter. The transmitted encrypted secret keys may be accompanied with the corresponding encrypted documents.

When the user wishes to play back a given document using his reader 4, he inserts his chip card 6 into the latter along with the recording medium 7 containing the encrypted document to play back. This document may also have been loaded previously into the memory 12 through the above-mentioned transmission means, or may reside in an external memory that may be plugged into the reader 4.

The processor 11 reads the identification code of the document to be played back and sends it to the chip card 6, which searches the secret key list 19 to find whether one of these keys is associated with the read and transmitted document identification code. If such is the case, the chip card 6 requests its public key from the reader, decrypts the secret key of the document to be played back using its private key, and encrypts this secret key by the public key provided by the reader 4. Thereafter, it transmits the encrypted secret key to processor 11, which decrypts the secret key, and then decrypts the document by means of the received and decrypted secret key and sends the decrypted information contained within the document to the decoding means 13 for playback with the appropriate playback means.

The chip card 6 executes a procedure for authenticating the public key received from the reader 4 which has previously been certified by a certification authority. This identification procedure generally includes checking whether the signature that has previously been associated to the reader's public key corresponds to that of the certification authority. This signature is determined by a public key of the certification authority stored in the chip card 6.

According to the present invention, when one or several licenses are purchased, the license server 2 also transmits a revocation list to the user containing certified identification codes or public keys of unauthorized document readers, which are considered to be pirate readers, or more generally, information allowing such readers to be identified. This information is stored within a reader data base 8 connected to the license server 2. This list is stored within a memory area 20 of the chip card at the moment it is received.

Thereafter, when the chip card 6 is inserted into the document reader 4, the processor 11 performs a reader identification process in which the reader transmits its identification code to the chip card, and the latter checks whether this identification code is on the list 20 of identification codes of unauthorized readers. If the reader 4 is not listed in this list 20, the chip card 6 enables the decryption of the document by requesting the identification code of the document to be played back from the document reader 4 and by transmitting, in response, the decryption key corresponding to this document.

In the opposite case, the chip card 6, by updating a flag value, memorizes the fact that it has been communicating with an unauthorized reader 4, so that later on, any further document playback by this chip card is prohibited. However, decrypting the document to be played back may still be allowed so as not to arouse the user's attention, and when the user connects again to the license server 2 for purchasing new licenses and thus receiving the corresponding decryption keys, the flag value is transmitted to the license server 2 along with the identification code of the chip card 6. The license server 2 may then identify the chip cards which are used in a fraudulent manner, and eventually refuse selling more licenses to the users of such chip cards, and may also deactivate the latter.

However, this approach is restricted by the memory capacity of the chip card 6. More specifically, the list 20 of unauthorized reader identification codes may become too long to be stored within the chip card. Furthermore, this approach does not allow fraudulent readers to be detected in a straightforward manner. To solve this problem, the list 20 of unauthorized reader codes stored in the chip card 6 is advantageously restricted to the most recent readers detected as fraudulent. Preferably, the chip card 6 also stores within its memory, upon each document playback, the authentication code of the document reader 4 used.

Advantageously, the chip card 6 manages a list of identification codes for the last readers used, as described below. Each time the chip card 6 is used in a reader 4, the reader identification code transmitted to the card is compared with identification codes of the last readers used, and is stored into a memory area having a predefined size in the chip card. If the code is not found therein, it is inserted into this memory area, which is advantageously of the FIFO type (First-In, First-Out). That is, an identification code is inserted in this memory area by overwriting the code stored first, if the memory is full.

Each time the chip card 6 is used for purchasing new document playback licenses, the contents of this memory area is transmitted to the license server 2 along with the chip card identification code, which may then store within the data base 8 the identification codes of the readers used, and count, for each reader identification code, the number of different chip cards that have been inserted into the reader identified by this code.

If this number exceeds a certain predefined threshold, for example 100, for a given reader identification code, this code is then marked as being that of a fraudulent reader and is inserted into an unauthorized reader revocation list managed by the license server 2. When licenses are purchased by a chip card 6, the license server 2 checks whether an unauthorized reader is listed in the list of codes of the last readers used, which is stored within the chip and transmitted to the server. If this is the case, it may, as mentioned previously, deny the requested licenses and/or insert a flag into the memory of the chip card 6 for prohibiting any new use of the card for document decryption. It may also instruct a card deactivation, or else, inform the chip card 6 of identification codes of unauthorized readers found in the transmitted list, so as to prevent the chip card from being used later on with an unauthorized reader, listed in the memory area of the last used readers.

It should be noted that if the number of identification codes stored in the list of the last readers used is sufficiently large, the license server 2 no longer needs to download a revoked reader list 20 into the chip card 6.

That which is claimed is:

1. A method for securing circulation of an encrypted digital document to be reproduced with a document reader, the method comprising:
    providing a user with a storage device storing identification information identifying the storage device and for storing an identification information list comprising identification information identifying recent document readers previously operated with the storage device;
    transmitting to a server over the digital data transmission network from the storage device to the server upon connection of the storage device to the server by a terminal connected to the digital data transmission network and to the storage device
        information identifying the digital document to be reproduced, and
        the information list and the identification information of the storage device;
    identifying from the server the storage device on the basis of the information identification of the storage device transmitted to the server;
    determining possible fraudulent use of the storage device based upon the information list that is transmitted to the server, the server comparing the identification information in the information list with an authorized or fraudulent reader list for determining fraudulent use of the storage device;
    if the storage device is not being fraudulently used, then transmitting over the digital data transmission network from the server to the computer terminal a decryption key specific to the digital document to be reproduced, with the decryption key being stored in the storage device;
    decrypting the digital document using the stored decryption key by the document reader connected to the storage device; and
    reproducing the digital document decrypted by the document reader; and
    if the storage device is being fraudulently used, then the decryption key is not transmitted over the digital data transmission network from the server to the storage device.

2. The method according to claim 1, wherein the decryption key is transmitted from the storage device to the document reader only if the document reader is authorized.

3. The method according to claim 1, wherein if the storage device is being fraudulently used, then further comprising deactivating the storage device by the server for prohibiting further use of the storage device.

4. The method according to claim 1, wherein the information list also identifies unauthorized document readers; and wherein fraudulent use of the storage device is also determined if the identification information associated with the document reader is on the information list.

5. The method according to claim 4, wherein the server builds from the identification information of the storage device and from the information list received from the storage device a table containing, for each identified document reader, a number of different storage devices used with the document reader; and further comprising:
    determining that a particular document reader is unauthorized if the corresponding number of different storage devices used with this particular document reader exceeds a threshold; and
    inserting the identification information of the document reader determined to be unauthorized into an unauthorized document reader list.

6. The method according to claim 1, wherein if the storage device is being fraudulently used, then the server deactivates the storage device over the digital data transmission network for prohibiting any further use of the storage device for reproducing a digital document.

7. The method according to claim 1, wherein the decryption key specific to the digital document being reproduced is stored in the storage device in association with the information identifying the digital document to be reproduced; and wherein the document reader transmits to the storage device the information identifying the digital document that has been transmitted to it for reproducing, and then receives from the storage device the decryption key associated with the information identifying the digital document for decrypting the digital document.

8. A method for securing circulation of an encrypted digital document to be reproduced with a document reader, the method comprising:
    providing a user with a smart card storing identification information identifying the storage device and for storing an identification information list comprising identification information identifying recent document readers operated with the smart card;
    transmitting to a server over the Internet from the smart card to the server upon connection of the smart card to the server by a computer terminal connected to the Internet and to the smart card
        information identifying the digital document to be reproduced, and the information list and the identification information of the smart card;

identifying from the server the smart card on the basis of the information identification of the smart card transmitted to the server;

determining possible fraudulent use of the smart card based upon the information list that is transmitted to the server, the server comparing the identification information in the information list with an authorized or fraudulent document reader list for determining fraudulent use of the smart card;

if the smart card is not being fraudulently used, then transmitting over the Internet from the server to the computer terminal a decryption key specific to the digital document to be reproduced, wherein the decryption key specific to the digital document being reproduced is stored in the smart card in association with the information identifying the digital document to be reproduced;

transmitting from the document reader to the smart card the information identifying the digital document that has been transmitted to it for reproducing, and then receiving at the document reader from the smart card the decryption key associated with the information identifying the digital document for decrypting;

decrypting the digital document using the stored decryption key by the document reader connected to the smart card; and reproducing the digital document decrypted by the document reader.

9. The method according to claim 8, wherein the decryption key is transmitted from the smart card to the document reader only if the document reader is authorized.

10. The method according to claim 8, wherein if the smart card is being fraudulently used, then the decryption key is not transmitted from the server to the smart card; and further comprising deactivating the smart card by the server for prohibiting further use of the smart card.

11. The method according to claim 8, wherein the information list also identifies unauthorized document readers; and wherein fraudulent use of the smart card is also determined if the identification information associated with the document reader is on the information list.

12. The method according to claim 11, wherein the server builds from the identification information of the smart card and from the information list received from the smart card a table containing, for each identified document reader, a number of different smart cards used with the document reader; and further comprising:

determining that a particular document reader is unauthorized if the corresponding number of different smart cards used with this particular document reader exceeds a threshold; and inserting the identification information of the document reader determined to be unauthorized into an unauthorized document reader list.

13. The method according to claim 8, wherein if the smart card is being fraudulently used, then the decryption key is not transmitted over the Internet from the server to the computer terminal.

14. The method according to claim 8, wherein if the smart card is being fraudulently used, then the server deactivates the smart card over the Internet for prohibiting any further use of the smart card for reproducing a digital document.

15. A system for securing circulation of an encrypted digital document to be reproduced with a document reader, the system comprising:

a storage device storing identification information identifying the storage device and for storing an identification information list comprising identification information identifying recent document readers previously operated with said storage device;

a server to be coupled to a digital data transmission network;

at least one terminal interfacing with said storage device for transmitting to said server the information identifying said storage device along with information identifying the digital document to be reproduced;

receiving from said server a specific decryption key for decrypting the digital document to be reproduced, with the decryption key being stored in said storage device, and transmitting to said server the information list which is transmitted from said storage device to said server upon connection of said storage device to said server; and said document reader for interfacing with said storage device and for reproducing the encrypted digital document, said document reader receiving from said storage device the decryption key for the digital document to be decrypted and reproduced and comprising a memory for storing the digital document to be reproduced and the decrypted key, a decoder for decrypting the digital document to be reproduced based upon the stored decryption key; and said server determining fraudulent use of said storage device based upon the identification information in the information list, said server comparing the identification information in the information list with an authorized or fraudulent document reader list for determining fraudulent use of said storage device, and if the storage device is being fraudulently used, then the decryption key is not transmitted over the digital data transmission network from the server to the storage device.

16. The system according to claim 15, wherein the decryption key is transmitted from said storage device to said document reader only if said document reader is authorized.

17. The system according to claim 15, wherein if said storage device is being fraudulently used, then said server deactivates said storage device for prohibiting further use.

18. The system according to claim 15, wherein the information list also identifies unauthorized document readers; and wherein fraudulent use of said storage device is also determined if the identification information associated with said document reader is on the information list.

19. The system according to claim 18, wherein said server builds from the identification information of said storage device and from the information list received from said storage device a table containing, for each identified document reader, a number of different storage devices used with said document reader, said server determining that a particular document reader is unauthorized if the corresponding number of different storage devices used with this document reader exceeds a threshold; and inserting the identification information of said document reader determined to be unauthorized into an unauthorized document reader list.

20. The system according to claim 15, wherein if said storage device is being fraudulently used, then said server deactivates said storage device over the digital data transmission network for prohibiting any further use of said storage device for reproducing a digital document.

21. The system according to claim 15, wherein the decryption key specific to the digital document being reproduced is stored in said storage device in association with the information identifying the digital document to be reproduced; and wherein said document reader transmits to said storage device the information identifying the digital document that has been transmitted to it for reproducing, and then receives from said storage device the decryption key associated with the information identifying the digital document for decrypting the digital document.

22. A system for securing circulation of an encrypted digital document to be reproduced with a document reader, the system comprising:
a smart card storing identification information identifying the smart card and for storing an identification information list comprising identification information identifying recent document readers previously operated with said smart card;
a server to be connected to the Internet;
at least one computer terminal to be connected to the Internet and interfacing with said smart card for
transmitting to said server the information identifying said smart card along with information identifying the digital document to be reproduced,
receiving from said server a specific decryption key for decrypting the digital document to be reproduced, with the decryption key being stored in said smart card, and
transmitting to said server the information list which is transmitted from said smart card to said server upon connection of said smart card to said server;
said smart card storing the decryption key specific to the digital document being reproduced in association with the information identifying the digital document to be re reproduced;
said document reader for transmitting to said smart card the information identifying the digital document that has been transmitted to it for reproducing and for reproducing the encrypted digital document, said document reader receiving from said smart card the decryption key associated with the information identifying the digital document for decrypting and reproducing the digital document and comprising
a decoder for decrypting the digital document to be reproduced based upon the stored decryption key; and
said server determining fraudulent use of said smart card based upon the identification information in the information list received from said smart card.

23. The system according to claim 22, wherein said smart card comprises a secure memory area for storing the identification information thereof.

24. The system according to claim 22, wherein the decryption key is transmitted from said smart card to said document reader only if said document reader is authorized.

25. The system according to claim 22, wherein said server is configured to not transmit the decryption key to said smart card and to deactivate said smart card for prohibiting further use thereof if said smart card is being fraudulently used.

26. The system according to claim 22, wherein the information list also identifies unauthorized document readers; and wherein fraudulent use of the smart card is also determined if the identification information of said document reader is on the information list.

27. The system according to claim 26, wherein said server builds from the identification information of said smart card and from the information list received from said smart card a table containing, for each identified document reader, a number of different smart cards used with said document reader, said server
determining that a particular document reader is unauthorized if the corresponding number of different smart cards used with this particular document reader exceeds a threshold; and
inserting the identification information of said document reader determined to be unauthorized into an unauthorized document reader list.

28. The system according to claim 22, wherein if said smart card is being fraudulently used, then the decryption key is not transmitted over the Internet from said server to said smart card.

29. The system according to claim 22, wherein if said smart card is being fraudulently used, then said server deactivates said smart card over the Internet for prohibiting any further use of said smart card for reproducing a digital document.

* * * * *

UNITED STATES PATENT AND TRADEMARK OFFICE
CERTIFICATE OF CORRECTION

PATENT NO. : 7,653,946 B2 Page 1 of 1
APPLICATION NO. : 10/799371
DATED : January 26, 2010
INVENTOR(S) : Bernard Kasser It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1718 days.

Signed and Sealed this

Twenty-eighth Day of December, 2010

David J. Kappos
*Director of the United States Patent and Trademark Office*